US010973221B1

(12) United States Patent
Caffrey

(10) Patent No.: US 10,973,221 B1
(45) Date of Patent: Apr. 13, 2021

(54) BIRD TRAPPING DEVICE

(71) Applicant: Carolee Caffrey, Sherman Oaks, CA (US)

(72) Inventor: Carolee Caffrey, Sherman Oaks, CA (US)

( * ) Notice: Subject to any disclaimer, the term of this patent is extended or adjusted under 35 U.S.C. 154(b) by 103 days.

(21) Appl. No.: 15/175,103

(22) Filed: Jun. 7, 2016

(51) Int. Cl.
*A01M 23/20* (2006.01)
*A01M 23/16* (2006.01)
*A01M 23/00* (2006.01)
*A01M 23/08* (2006.01)

(52) U.S. Cl.
CPC ............ *A01M 23/20* (2013.01); *A01M 23/08* (2013.01); *A01M 23/16* (2013.01); *A01M 2200/00* (2013.01)

(58) Field of Classification Search
CPC ...... A01M 23/16; A01M 23/18; A01M 23/20; A01M 23/08; A01M 23/02; A01M 23/00; A01K 31/00; A01K 31/007
USPC ...... 43/60, 61, 64, 65, 67, 58; 119/428, 429, 119/431, 432
See application file for complete search history.

(56) References Cited

U.S. PATENT DOCUMENTS

| | | | | |
|---|---|---|---|---|
| 205,609 | A * | 7/1878 | Bronson | A01K 31/007 119/480 |
| 784,453 | A * | 3/1905 | Voelkerding | A01M 21/00 43/68 |
| 1,218,514 | A * | 3/1917 | Blakeslee | A01M 23/18 43/61 |
| 1,243,008 | A * | 10/1917 | Taylor | A01M 23/18 43/61 |
| 1,345,716 | A * | 7/1920 | Sudul | A01M 23/08 43/61 |
| 1,374,014 | A * | 4/1921 | Jakubowski | A01M 23/02 43/61 |
| 1,375,286 | A * | 4/1921 | Gibbs | A01M 23/24 43/96 |
| 1,384,610 | A * | 7/1921 | Gorniak | A01M 23/00 43/61 |
| 1,506,045 | A * | 8/1924 | Boyer | A01M 23/08 43/65 |
| 1,619,527 | A * | 3/1927 | Moore | A01K 31/16 119/340 |

(Continued)

FOREIGN PATENT DOCUMENTS

DE 4216976 A1 * 11/1992 ............ A01M 23/20
FR 3018667 A1 * 9/2015 ............ A01M 23/20

(Continued)

*Primary Examiner* — Darren W Ark
(74) *Attorney, Agent, or Firm* — John R. Ross; John R. Ross, III

(57) ABSTRACT

The bird trapping device includes a potter trap that is mounted atop of a telescoping stand. The telescoping stand enables a height of the potter trap to be adjusted. The potter trap is able to rotate about a vertical axis atop of the telescoping stand. The potter trap includes at least one food bowl therein and/or at least one water bowl. A treadle mechanism is included in the potter trap, and upon activation shall close a door thereby capturing a bird that happens to enter the potter trap. A flag is connected to the door, and rotates to a vertical orientation once the door closes the potter trap. The telescoping stand may include wheels to mobilize the bird trapping device. Optionally, the telescoping stand includes a gearing member that is able to raise and lower the potter trap.

7 Claims, 7 Drawing Sheets

(56) References Cited

U.S. PATENT DOCUMENTS

| | | | | |
|---|---|---|---|---|
| 1,633,857 A * | 6/1927 | Gonzalez | A01M 23/00 | 43/62 |
| 1,677,723 A * | 7/1928 | Maxwell | A01M 23/00 | 43/68 |
| 1,954,286 A * | 4/1934 | Dercum | A01K 39/014 | 119/428 |
| 2,093,719 A * | 9/1937 | Sadakichi | A01M 23/24 | 43/58 |
| 2,682,726 A * | 7/1954 | Gustin | A01M 23/02 | 119/344 |
| 2,769,273 A * | 11/1956 | Martin | A01M 23/18 | 43/61 |
| 2,897,627 A * | 8/1959 | Neid | A01M 23/02 | 43/65 |
| 3,017,858 A * | 1/1962 | Brown | A01K 31/14 | 119/428 |
| 3,086,499 A * | 4/1963 | Dilley | A01K 39/0113 | 119/431 |
| 3,367,632 A * | 2/1968 | Vail | A01K 31/14 | 119/428 |
| 3,393,468 A * | 7/1968 | Wood | A01M 23/08 | 43/66 |
| 3,696,792 A * | 10/1972 | Bruhns | A01K 31/14 | 119/428 |
| 3,778,922 A * | 12/1973 | Clark | A01M 23/02 | 43/61 |
| 3,792,685 A * | 2/1974 | Wiener | A01K 31/14 | 119/428 |
| 3,818,868 A * | 6/1974 | Boehland, Jr. | A01K 31/14 | 119/431 |
| 3,986,480 A * | 10/1976 | Vail | A01K 31/14 | 119/428 |
| 4,030,229 A * | 6/1977 | Sale | A01M 23/04 | 43/69 |
| 4,150,505 A * | 4/1979 | Voelker | A01M 23/04 | 119/428 |
| 4,167,917 A * | 9/1979 | Noll | A01K 39/014 | 119/429 |
| 4,175,517 A * | 11/1979 | Kilgore | A01K 31/24 | 119/428 |
| 4,471,721 A * | 9/1984 | Vail | A01M 23/20 | 119/428 |
| 4,563,835 A * | 1/1986 | Job | A01M 23/14 | 43/60 |
| 4,765,277 A * | 8/1988 | Bailey | A01K 39/012 | 119/428 |
| 4,774,785 A * | 10/1988 | Fuhrman | A01M 23/32 | 43/63 |
| 4,779,373 A * | 10/1988 | Krenson | A01K 31/10 | 43/61 |
| 4,829,701 A * | 5/1989 | ImBrogno | A01K 31/10 | 43/61 |
| 5,134,970 A * | 8/1992 | Oh | A01K 31/14 | 119/428 |
| 5,172,651 A * | 12/1992 | Finn | A01K 31/10 | 119/428 |
| 5,325,622 A * | 7/1994 | Merickel | A01M 23/08 | 119/428 |
| D410,519 S * | 6/1999 | Greenough | D22/119 | |
| 5,957,086 A * | 9/1999 | Gallardo | A01K 31/06 | 119/429 |
| 6,009,837 A * | 1/2000 | McClasky | A01K 31/14 | 119/428 |
| 6,095,087 A * | 8/2000 | Bloedorn | A01K 39/012 | 119/429 |
| 6,343,568 B1 * | 2/2002 | McClasky | A01K 31/14 | 119/428 |
| 6,477,983 B1 * | 11/2002 | Bette | A01K 31/14 | 119/428 |
| 6,516,750 B1 * | 2/2003 | Heinzeroth | A01K 31/00 | 119/428 |
| 6,684,560 B2 * | 2/2004 | Lafforthun | A01M 23/16 | 43/61 |
| 6,880,486 B2 * | 4/2005 | Sonnek | A01K 31/14 | 119/428 |
| 6,923,143 B2 * | 8/2005 | Plante | A01K 31/06 | 119/432 |
| 7,500,448 B1 * | 3/2009 | Melhorn | B62B 5/0079 | 119/401 |
| 8,418,396 B2 * | 4/2013 | Moustirats | A01M 23/20 | 43/61 |
| 8,661,726 B2 * | 3/2014 | Alfarhan | A01M 23/20 | 43/105 |
| 8,683,737 B2 * | 4/2014 | Studer | A01M 23/08 | 43/58 |
| 8,733,291 B2 * | 5/2014 | Dunigan | A01K 31/00 | 119/463 |
| 9,943,073 B2 * | 4/2018 | Brugh | A01M 23/00 | |
| 2006/0156616 A1 * | 7/2006 | Ried | A01M 23/08 | 43/65 |
| 2014/0318007 A1 * | 10/2014 | Hogan | F16M 11/18 | 47/39 |
| 2018/0116201 A1 * | 5/2018 | Brugh | A01M 23/00 | |

FOREIGN PATENT DOCUMENTS

| | | | | |
|---|---|---|---|---|
| FR | 3018668 A1 * | 9/2015 | | A01M 23/20 |
| GB | 190900963 A * | 5/1909 | | A01M 23/16 |
| GB | 191407750 A * | 3/1915 | | A01M 23/18 |
| GB | 213806 A * | 4/1924 | | A01M 23/18 |
| GB | 924488 A * | 4/1963 | | A01M 23/16 |
| KR | 20130051233 A * | 5/2013 | | |

* cited by examiner

BIRD TRAPPING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of bird capturing and containment systems, more specifically, a device that is adapted to trap birds.

SUMMARY OF INVENTION

The bird trapping device includes a potter trap that is mounted atop of a telescoping stand. The telescoping stand enables a height of the potter trap to be adjusted. The potter trap is able to rotate about a vertical axis atop of the telescoping stand. The potter trap includes at least one food bowl and/or at least one water bowl therein. A treadle mechanism is included in the potter trap, and upon activation shall close a door thereby capturing a bird that happens to enter the potter trap. A flag is connected to the door, and rotates to a vertical orientation once the door closes the potter trap. The telescoping stand may include wheels to mobilize the bird trapping device. Optionally, the telescoping stand includes a gearing member that is able to raise and lower the potter trap. The gearing member may be manually operated or include an electrical motor to automate the process.

These together with additional objects, features and advantages of the bird trapping device will be readily apparent to those of ordinary skill in the art upon reading the following detailed description of the presently preferred, but nonetheless illustrative, embodiments when taken in conjunction with the accompanying drawings.

In this respect, before explaining the current embodiments of the bird trapping device in detail, it is to be understood that the bird trapping device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bird trapping device.

It is therefore important that the claims be regarded as including such equivalent construction insofar as they do not depart from the spirit and scope of the bird trapping device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
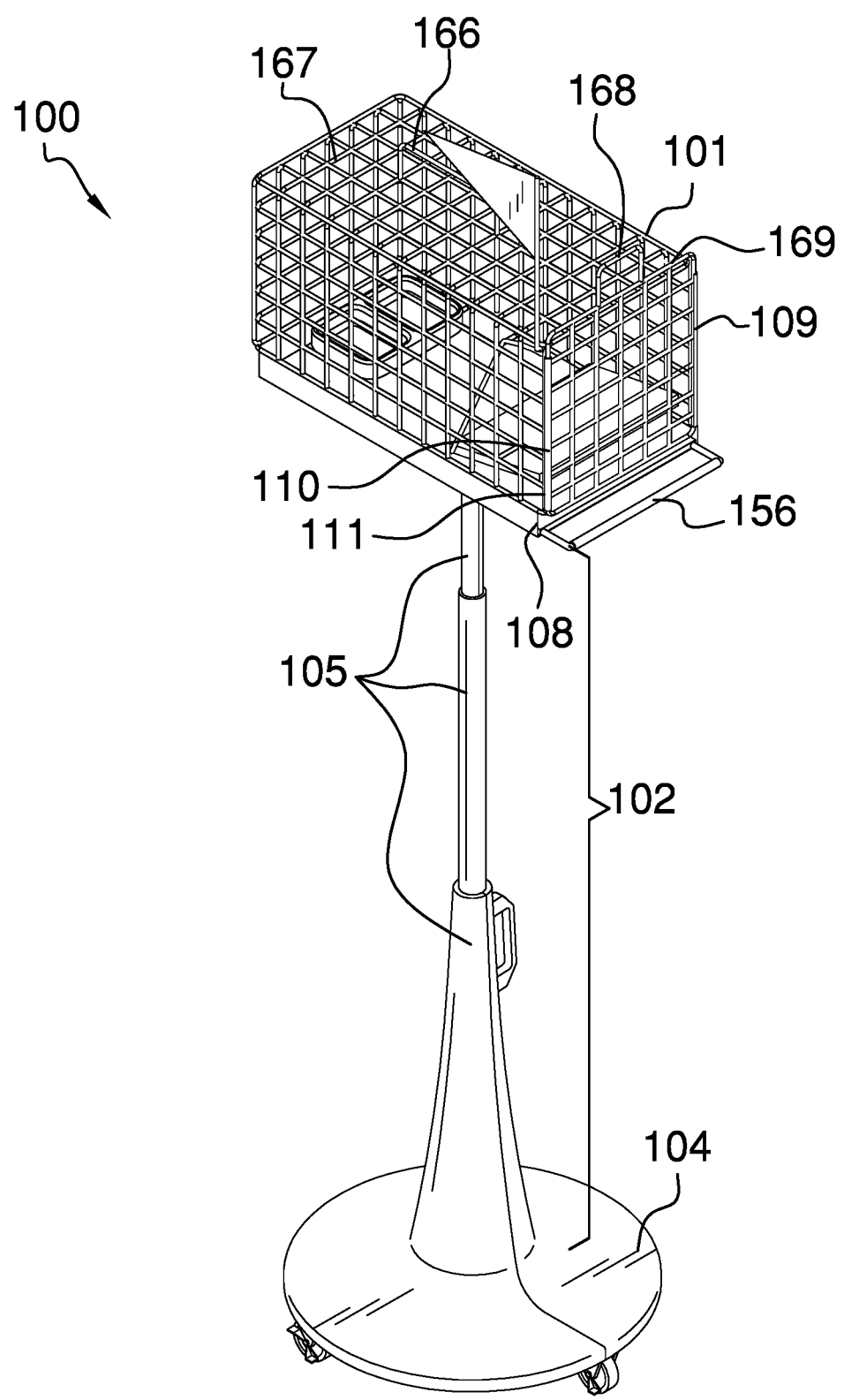
FIG. 1 is a perspective view of an embodiment of the disclosure.
Figure 2:
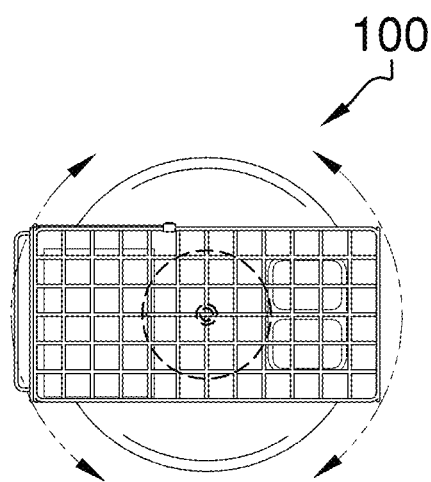
FIG. 2 is a top view of an embodiment of the disclosure.
Figure 3:
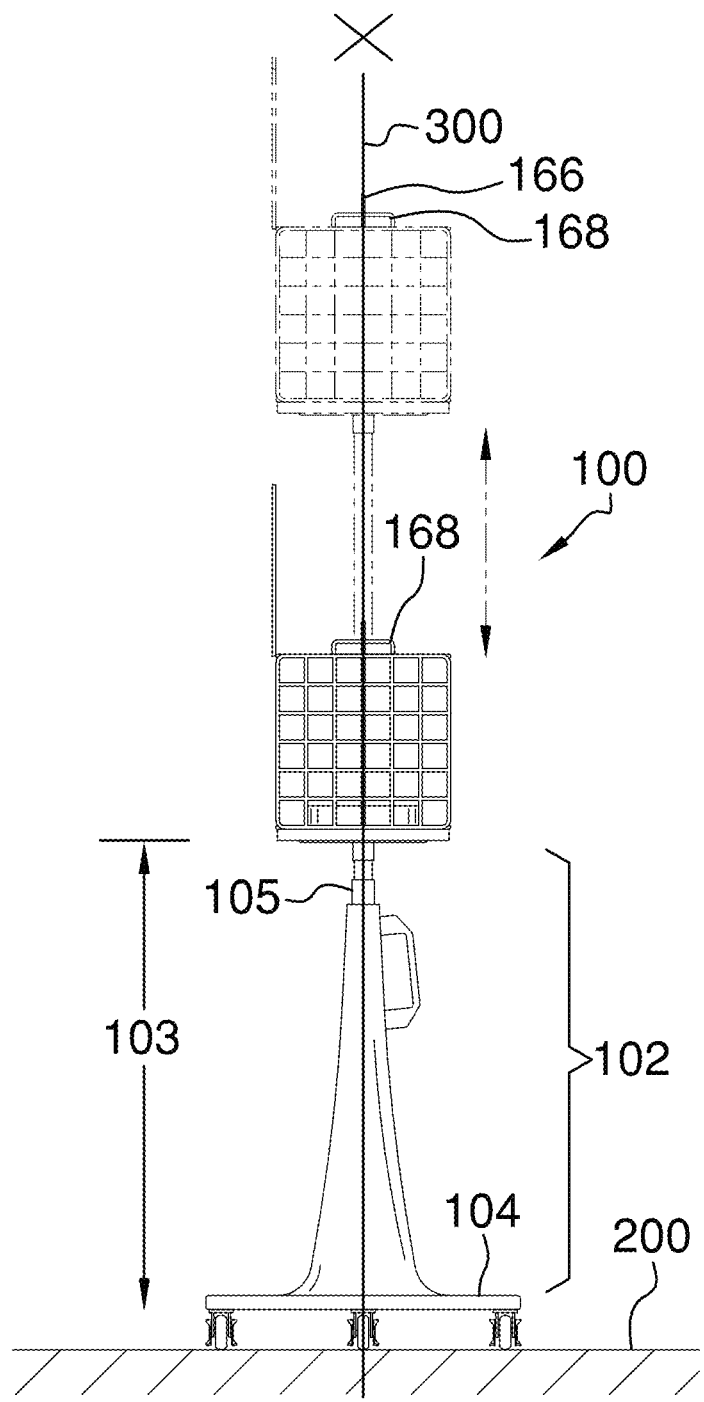
FIG. 3 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5. The bird trapping device 100 (hereinafter invention) comprises a potter trap 101 mounted atop of a telescoping stand 102. The potter trap 101 is able to adjust an elevation 103 with respect to a ground surface 200 via the telescoping stand 102. The potter trap 101 is also able to rotate about a vertical axis 300.

The telescoping stand 102 is further defined with a base 104 from which a plurality of telescoping members 105 extend and retract in order to adjust the elevation 103 of the potter trap 101. A topmost telescoping member 106 is affixed to a bottom box surface 107 of the potter trap 101. The topmost telescoping member 106 may be selectively attached to the potter trap 101. Moreover, the potter trap 101 may be removed from the telescoping stand 102 for transportation purposes.

A box bracket 177 may be positioned betwixt the topmost telescoping member 106 and the bottom box surface 107 of the potter trap 101. The box bracket 177 interfaces with the topmost telescoping member 106 in order to selectively remove the potter trap 101 from the telescoping stand 102. The topmost telescoping member 106 includes a spring-loaded button 178 to interacts with a hole 179 provided in the box bracket 177 to secure the topmost telescoping member 106 to the box bracket 177.

The base 104 may include a plurality of wheels 180 thereunder, which mobilizes the invention 100. The plurality of wheels 180 may be caster wheels. Moreover, the plurality of wheels 180 may be locking caster wheels so as to enable locking in place the invention 100 as needed. The base 104 resembles a circular disc with a conical protuberance 181 that extends vertically from a top base surface 182. The conical protuberance 181 may also be one of the plurality of telescoping members 105.

The potter trap 101 is a cage of metal or plastic construction, which has a plurality of openings to enable visibility to an interior of the potter trap 101. A front distal end 108 includes a door 109. The door 109 is attached to the front distal end 108 via a slide arm 110. The slide arm 110 is positioned on a side edge 111 of the front distal end 108 of the potter trap 101. The slide arm 110 enables the door 109 to slide up or down with respect to the front distal end 108 of the potter trap 101 (see FIG. 5).

The potter trap 101 is further defined with an inner, bottom surface 112 that is adapted to enable a bird 500 to enter the potter trap 101. The potter trap 101 may also include at least one food bowl 113. Moreover, the at least one food bowl 113 may be referred to as a water bowl. Optionally, the invention 100 may include at least one food bowl and/or at least one water bowl. The door 109 is actuated from an open position to a closed position via a treadle mechanism 114. The treadle mechanism 114 holds the door 109 in the open position, and releases the door 109 to the closed position when so actuated (see FIG. 5).

The treadle mechanism 114 is located adjacent the front distal end 108 of the potter trap 101. The treadle mechanism 114 rotates with respect to a treadle slide arm 115. The treadle mechanism 114 is attached to a release armature 116 that extends to the door 109. The release armature 116 extends at a diagonal orientation with respect to the potter trap 101. Moreover, the release armature 116 is releasably attached onto the door 109, and upon movement of the treadle mechanism 114 shall disengage the release armature 116 from the door 109, thereby releasing the door 109 from the open position to the closed position (see FIG. 5).

The door 109 is affixed to a flag 117. The flag 117 is rigidly affixed to the door 109, and rotates in concert with the rotational movement of the door 109 from the open position to the closed position. The flag 117 is rotated to a vertical position when the door 109 is in the closed position. The flag 117 is used to alert as to the position of the door 109 thereby detecting whether the bird 500 has been captured inside of the potter trap 101.

Figure 6:
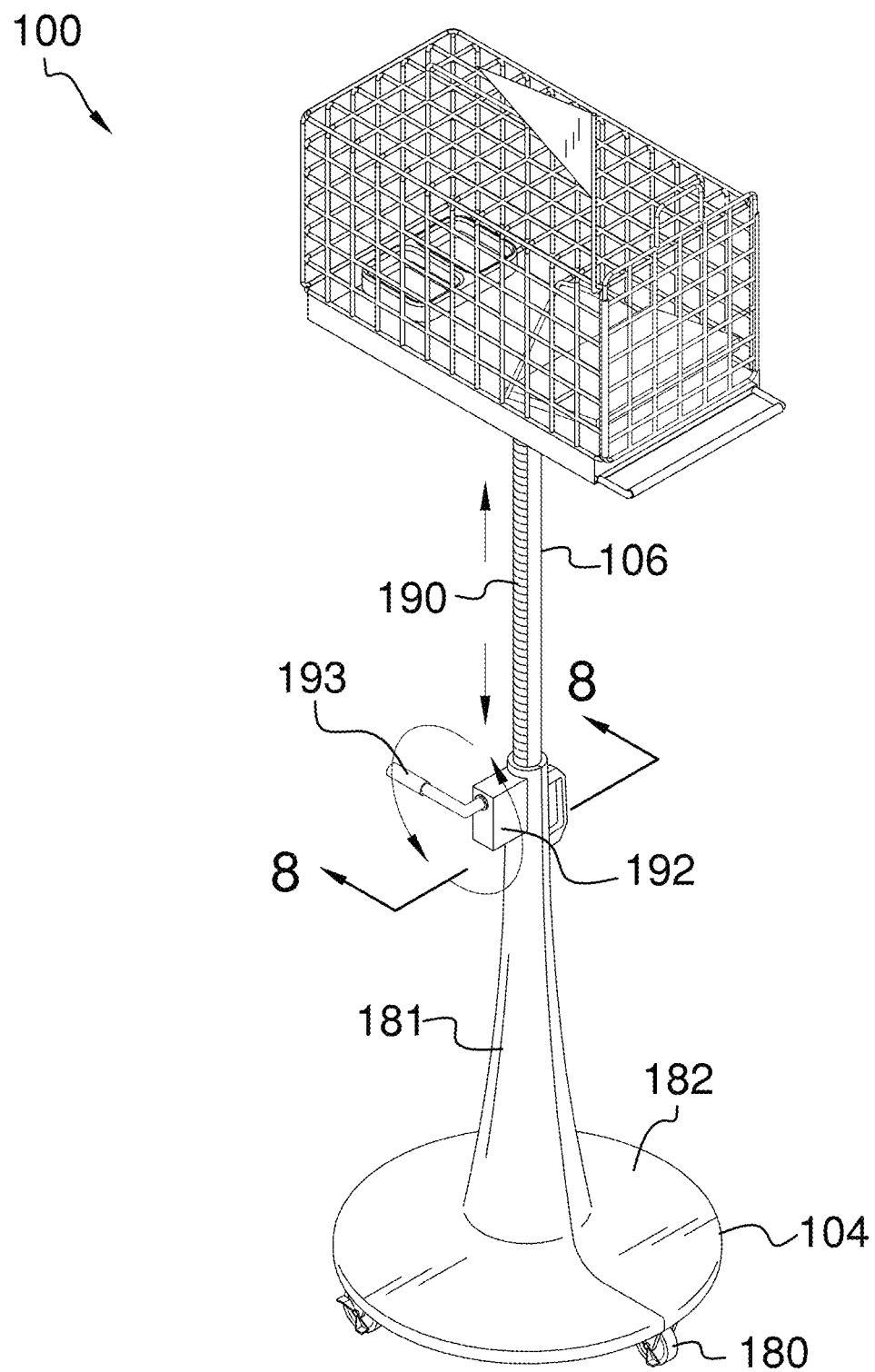
FIG. 6 is a perspective view of an embodiment of the disclosure.
Figure 7:
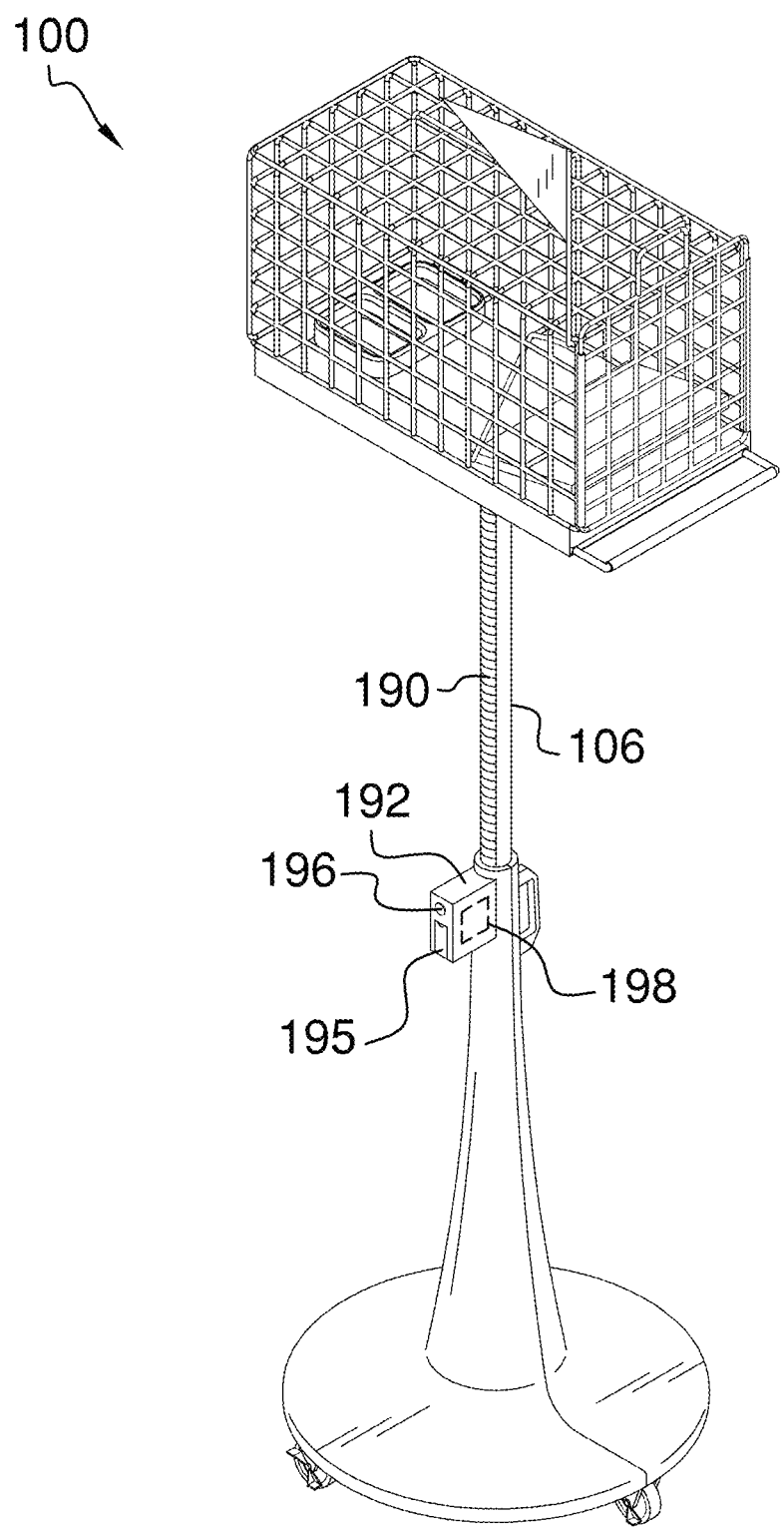
FIG. 7 is a perspective view of an alternative embodiment of the disclosure.
Figure 8:
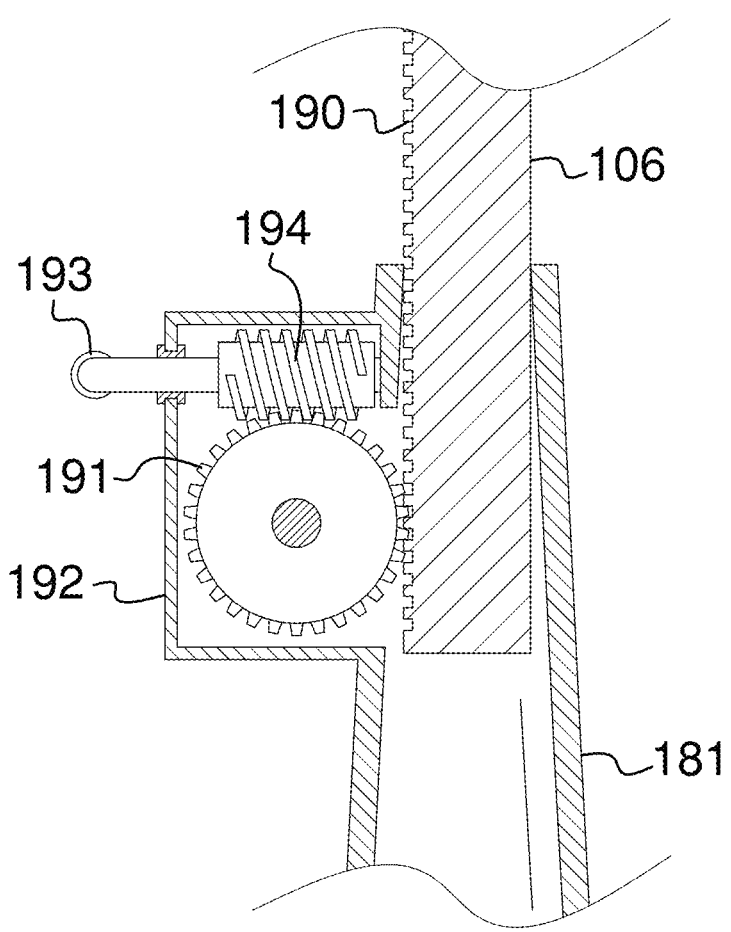
FIG. 8 is a cross-sectional view of an embodiment of the disclosure along line 8-8 in FIG. 6.

Referring to FIGS. 6-8, the telescoping stand 102 may involve alternative embodiments. More specifically, the topmost telescoping member 106 involves a rack 190 that interacts with a pinion gear 191. The pinion gear 191 is situated in a gear housing 192 provided on the conical protuberance 181. A hand crank 193 is provided to manually operate the pinion gear 191 in order to raise or lower the topmost telescoping member 106 with respect to the conical protuberance 181. The hand crank 193 includes a worm gear 194 that is in mechanical connection with the pinion gear 191, and the pinion gear 191 is in mechanical connection with the rack 190 (see FIG. 8).

FIG. 7 introduces a variation of an alternative embodiment. More specifically, the embodiment of FIG. 7 replaces the hand crank 193 for a motor 198 that is located within the gear housing 192. The motor 198 is in mechanical connection with the worm gear 194. The motor 198 is wired to a battery provided in a battery compartment 195 located on the gear housing 192. The motor 198 is wired to an on/off button 196 provided on the gear housing 192. It shall be noted that the motor 198 may be wired to electrical cord that plugs into a standard wall outlet, which is well known in the art, and is done in lieu of the battery.

Figure 4:
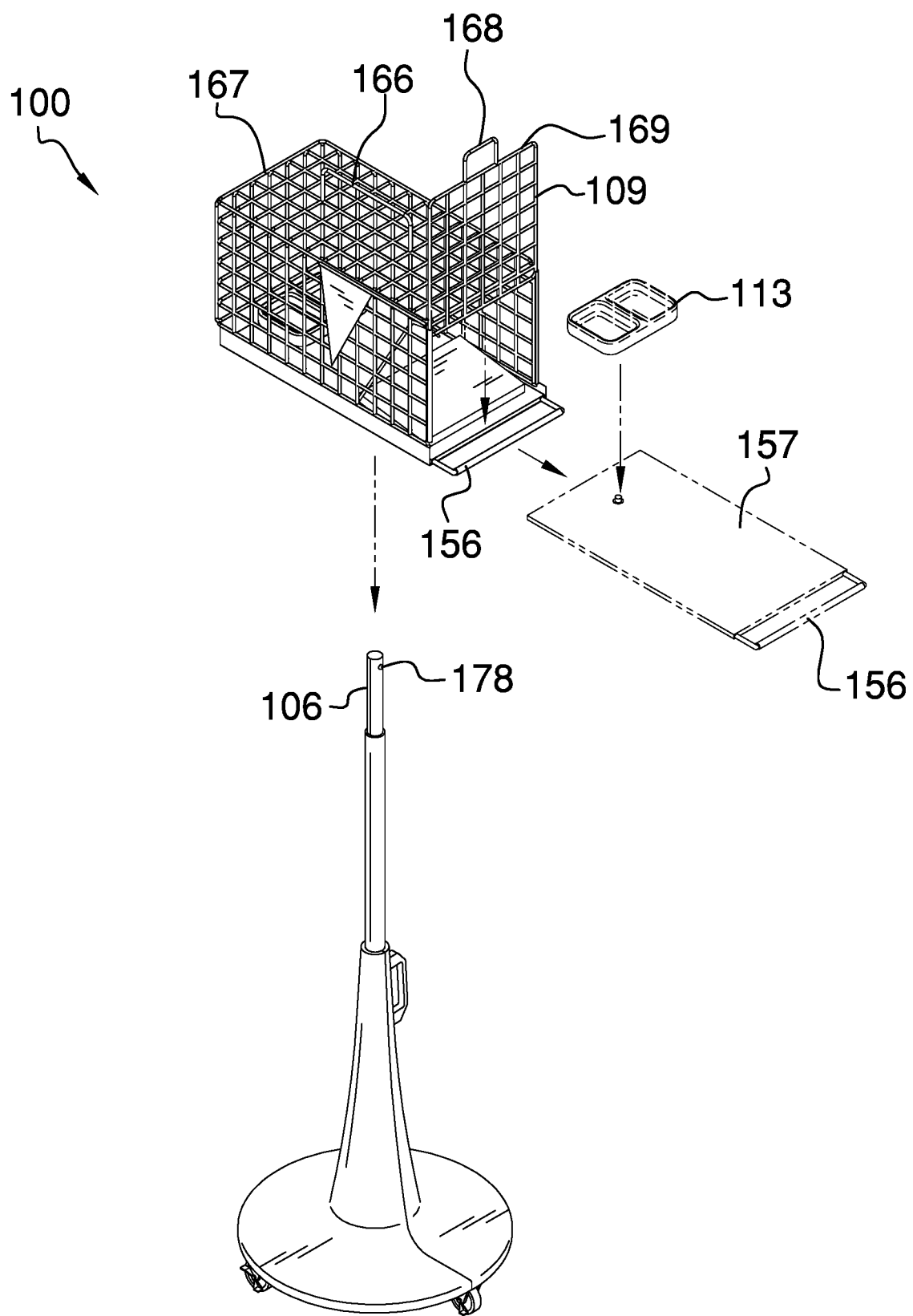
FIG. 4 is another perspective view of an embodiment of the disclosure.
Figure 5:
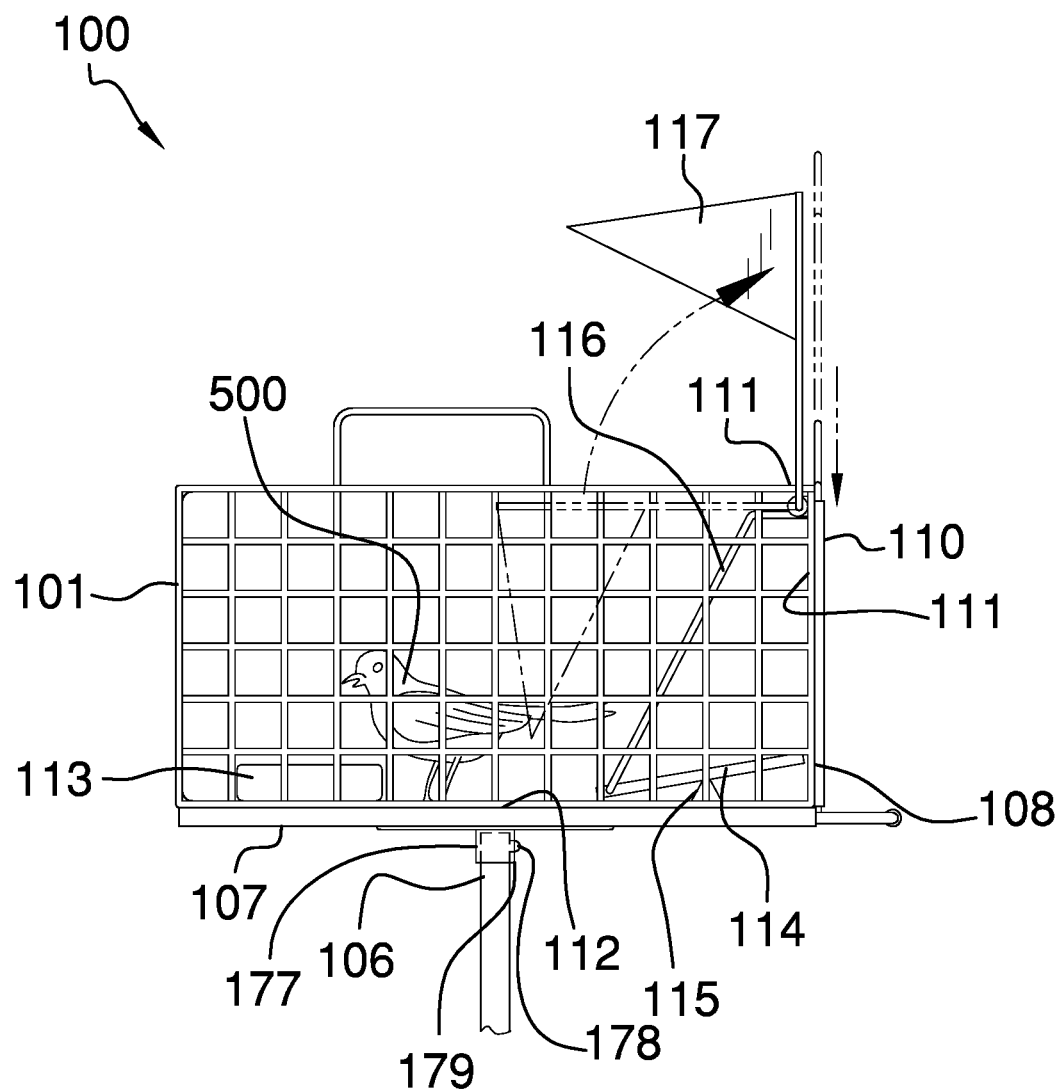
FIG. 5 is a detail view of an embodiment of the disclosure.

Referring to FIG. 4, the potter trap 101 may include a handle 166 on a top surface 167. The handle 166 enables the invention 100 to be manipulated as needed. Optionally, the door 109 may include a door handle 168 on a top edge 169 of the door 109. The door handle 168 aids in raising the door 109 to reset the treadle mechanism 114 or to simply provide access to the bird 500.

Referring to FIG. 4, a landing perch 156 is provided below and in front of the door 109. The landing perch 156 is a part of a removable tray 157 that is able to slide in and out from under the potter trap 101. The landing perch 156 of the removable tray 157 doubles as a trap handle to aid in removal of the removable tray 157 with respect to the potter trap 101. The removable tray 157 slides in and out of the potter trap 101 and rests atop of the inner, bottom surface 112 of the potter trap 101.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A bird trapping device comprising:
   a potter trap affixed atop of a telescoping stand in order to adjust an elevation of the potter trap with respect to a ground surface;
   wherein the potter trap is adapted to catch a wild bird;
   wherein the telescoping stand is further defined with a base from which a plurality of telescoping members extend and retract in order to adjust the elevation of the potter trap;
   wherein the plurality of telescoping members is further defined with a topmost telescoping member;
   wherein a box bracket is positioned betwixt the topmost telescoping member and a bottom box surface of the potter trap;
   wherein the box bracket interfaces with the topmost telescoping member in order to selectively remove the potter trap from the telescoping stand;
   wherein the topmost telescoping member includes a spring-loaded button that interacts with a hole provided in the box bracket to selectively secure the topmost telescoping member to the box bracket;
   wherein the potter trap is a cage, which has a plurality of openings to enable visibility to an interior of the potter trap;
   wherein a front distal end of the potter trap includes a door;
   wherein the door is actuated from an open position to a closed position via a treadle mechanism;

wherein the door is attached to the front distal end via a slide arm;

wherein the slide arm is positioned on a side edge of the front distal end of the potter trap, and enables the door to slide up and down;

wherein the potter trap is further defined with an inner, bottom surface that is adapted to enable the bird to enter the potter trap;

wherein the potter trap includes at least one food bowl or at least one water bowl; wherein the potter trap includes a handle on a top surface thereof;

wherein the handle enables the bird trapping device to be manipulated as needed;

wherein the door includes a door handle on a top edge of the door; wherein the door handle aids in raising the door to reset the treadle mechanism or to adaptively retrieve the bird;

wherein a landing perch is provided below and in front of the door;

wherein the landing perch is a part of a removable tray that is able to slide in and out from the potter trap;

wherein the landing perch of the removable tray is used as a tray handle to aid in removal of the removable tray with respect to the potter trap;

wherein the door is connected to a flag;

wherein the flag rotates in concert with a longitudinal movement of the door from the open position to the closed position;

wherein the base includes a plurality of wheels there under, which mobilizes the bird trapping device;

wherein the potter trap is also able to rotate about a vertical axis;

wherein the base is further defined as a circular disc with a conical protuberance that extends vertically from a top base surface; wherein the conical protuberance is a lowest one of the plurality of telescoping members.

2. The bird trapping device according to claim 1 wherein the treadle mechanism holds the door in the open position, and releases the door to the closed position when so actuated.

3. The bird trapping device according to claim 2 wherein the treadle mechanism is located adjacent the front distal end of the potter trap.

4. The bird trapping device according to claim 3 wherein the treadle mechanism rotates with respect to a treadle slide arm.

5. The bird trapping device according to claim 4 wherein the treadle mechanism is attached to a release armature that extends to the door.

6. The bird trapping device according to claim 5 wherein the release armature extends upwardly at a diagonal orientation with respect to the inner, bottom surface; wherein the release armature is releasably attached onto the door, and upon movement of the treadle mechanism shall disengage the release armature from the door, thereby releasing the door from the open position to the closed position.

7. The bird trapping device according to claim 6 wherein the flag is rotated to a vertical position when the door is in the closed position; wherein the flag is used to alert as to the position of the door thereby detecting whether the bird has been captured inside of the potter trap.

* * * * *